United States Patent [19]

Truitt et al.

[11] Patent Number: 5,208,001
[45] Date of Patent: May 4, 1993

[54] METHOD FOR SILICON PURIFICATION

[75] Inventors: James K. Truitt, Dallas; Mohendra S. Bawa, Plano, both of Tex.

[73] Assignee: Texas Instruments Incorporated, Dallas, Tex.

[21] Appl. No.: 718,171

[22] Filed: Jun. 20, 1991

[51] Int. Cl.⁵ .............................................. C01B 33/02
[52] U.S. Cl. .................................................... 423/348
[58] Field of Search ................. 423/348, 349, 350, 69, 423/71

[56] References Cited

U.S. PATENT DOCUMENTS

| 4,246,249 | 1/1981 | Dawless | 423/348 |
| 4,256,717 | 3/1981 | Dawless | 423/348 |
| 4,312,849 | 1/1982 | Kramer | 423/348 |
| 4,822,585 | 4/1989 | Dawless | 423/348 |
| 4,828,814 | 5/1989 | Sanjurjo et al. | 423/348 |

FOREIGN PATENT DOCUMENTS

| 0200668 | 6/1983 | Fed. Rep. of Germany | 423/348 |
| 1-061309 | 3/1989 | Japan | 423/348 |

Primary Examiner—Olik Chaudhuri
Assistant Examiner—Ken Horton
Attorney, Agent, or Firm—Gary C. Honeycutt; Richard L. Donaldson; William E. Hiller

[57] ABSTRACT

A method of removing impurities from low grade silicon is provided comprising adding a zirconium compound to the low grade silicon for adsorbing the impurities.

22 Claims, 1 Drawing Sheet ial. The following table compares approximate levels of significant impurities in metallurgical grade silicon and solar grade silicon, a higher grade silicon that can be used for producing efficient solar cells.

METHOD FOR SILICON PURIFICATION

TECHNICAL FIELD OF THE INVENTION

This application relates generally to methods for purifying silicon. More particularly, but not by way of limitation, this application relates to methods for purifying metallurgical grade silicon.

BACKGROUND OF THE INVENTION

Silicon is widely used in making photovoltaic solar cells, which convert light into electricity. Silicon commonly exists in nature in the form of silica or silicon dioxide ($SiO_2$). Quartzite, which is composed largely of silica, is widely used as the starting material for obtaining the silicon used in making solar cells. Silicon can be produced from quartzite through well-known processes like the submerged arc process. In the submerged arc process, a carbon-based reducing agent is reacted with the quartzite to produce silicon along with by-products. The silicon produced by the submerged arc process and other processes typically includes impurities like boron, phosphorus, iron, calcium and aluminum.

Silicon can be classified according to its level of purity. Low grade silicon like metallurgical grade silicon is less pure than a higher grade silicon. It is well known that solar cells made from a high grade silicon can be significantly more efficient than solar cells made from a lower grade silicon. Consequently, high grades of silicon are preferred for use in making solar cells. Low grade silicon like metallurgical grade silicon should, therefore, be purified before it is used as solar cell material. The following table compares approximate levels of significant impurities in metallurgical grade silicon and solar grade silicon, a higher grade silicon that can be used for producing efficient solar cells.

| Type Impurity | Metallurgical Grade Silicon (parts per million) | Solar Grade Silicon (parts per million) |
| --- | --- | --- |
| Boron | 10–20 | less than 1 |
| Phosphorus | 10–20 | less than 1 |
| Iron | 800–3000 | less than 10 |
| Aluminum | 800–3000 | less than 10 |
| Calcium | 20–1000 | less than 10 |

Unfortunately, purification of metallurgical grade silicon by conventional methods is difficult and expensive. Thus, a need has arisen for a method of purifying silicon that is effective and inexpensive relative to conventional methods. An object of this invention is to provide such a method for converting low grade silicon into a higher grade silicon that can be used for making efficient solar cells.

"Low grade" silicon is defined as silicon having impurity levels greater than the impurity levels permitted in "solar grade" silicon.

SUMMARY OF THE INVENTION

A method of removing impurities from low grade silicon comprising adding a zirconium compound to the low grade silicon for adsorbing boron and other impurities. A technical advantage of the method disclosed herein is that it allows low grade silicon to be effectively and economically purified.

BRIEF DESCRIPTION OF THE DRAWINGS

The foregoing and additional objects and advantages of the invention will become more apparent as the following detailed description is read in conjunction with the accompanying FIG. 1 flow diagram, which illustrates the preferred method for silicon purification according to the present invention.

DETAILED DESCRIPTION OF THE INVENTION

Figure 1:
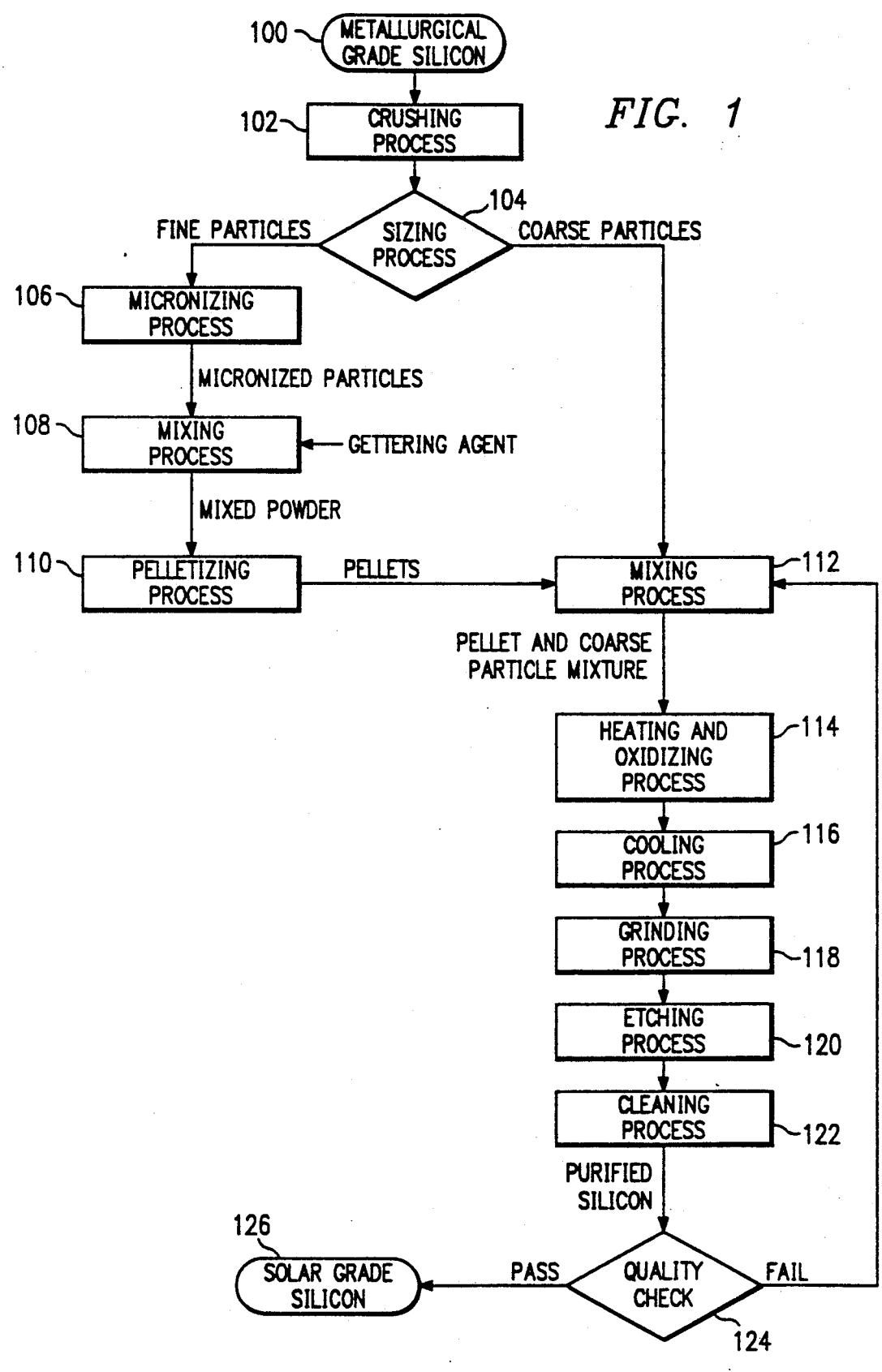

FIG. 1 is a flow diagram illustrating the preferred method for purifying low grade silicon. More particularly, FIG. 1 illustrates a method for converting metallurgical grade silicon into solar grade silicon.

The starting material as indicated at 100 is metallurgical grade silicon. As previously noted, metallurgical grade silicon can be obtained from quartzite by well known processes including the submerged arc process. Metallurgical grade silicon comprises about 98–99% silicon and about 1–2% impurities. Significant impurities found in metallurgical grade silicon include boron, phosphorus, iron, calcium and aluminum.

The metallurgical grade silicon is first crushed in a crushing process 102 into small particles by any well-known crushing apparatus. The particles produced by this process are then subjected to a sizing process 104, where they are separated according to size. Particles having diameters larger than or equal to 0.030 inches are labelled as coarse particles and are separated from particles that are smaller than 0.030 inches, which are labelled as fine particles.

The fine particles are then micronized or made into a powder form in a micronizing process 106. The micronizing process 106 produces micronized particles having diameters of less than 10 microns. The micronizing process 106 can be accomplished by any well-known micronizing apparatus or method.

A gettering agent is then added to the micronized particles in a mixing process 108. As will be further described below, the gettering agent will cause adsorption of impurities from the silicon. It is preferred that the gettering agent include the element zirconium. Zirconium is readily available in the form of zirconium compounds like zirconia or zirconium dioxide ($ZrO_2$). Zirconia can be crushed and micronized into a powder form and added to and intimately mixed with the micronized silicon particles in the mixing process 108 to form a mixed powder.

The mixed powder is then pelletized or made into pellets by a pelletizing process 110, which can comprise any well-known pelletizing method or apparatus. It is preferred that the pellets have diameters between 0.020 inches and 0.060 inches.

The pellets produced in the pelletizing process 110 are then mixed in a mixing process 112 with the coarse particles previously separated from the fine particles in the sizing process 104. The mixing process 112 produces a pellet and coarse particle mixture, which is then subjected to a heating and oxidizing process 114. It should be noted that the coarse particles need not have been initially separated from the fine particles in the sizing process 104; all of the particles produced by the crushing process 102 could have been micronized at 106, mixed with gettering at 108, pelletized at 110 and heated and oxidized at 114. The preferred method includes the sizing process 104 for separating the coarse and fine particles to reduce micronizing and pelletizing costs. It has been found that mixing untreated coarse particles with pellets, which include gettering material, provides an economical, yet effective method of silicon purification.

After the coarse particles have been mixed with the pellets at 112, the pellet and coarse particle mixture is subjected to the heating and oxidizing process 114. In the heating and oxidizing process 114, the pellet and coarse particle mixture is heated in an air atmosphere to a temperature slightly higher than 1420° C. This process causes oxidation of the outer surfaces of the coarse particles and the pellets. Silicon in the pellets and coarse particles reacts with oxygen in the air to form an outer layer of slag, which is primarily silica in a solid crust form. The slag subsequently acts as a crucible for the remaining generally unoxidized silicon that it surrounds. As heat is applied in the heating and oxidizing process 114, the unoxidized silicon within the slag becomes molten. The slag, however, remains in a generally solid state.

Impurities in the molten silicon, particularly iron, aluminum and calcium, are drawn by and migrate toward the slag. The impurities subsequently react with and are adsorbed by the slag. Similarly, the zirconia particles in the pellets migrate toward and react with the slag, forming primarily zirconium silicate. The zirconium silicate in the slag, in turn, draws out and adsorbs impurities. Zirconium silicate has been found to be particularly effective for drawing out and adsorbing boron. Boron is a dissolved silicon impurity that has been found difficult to remove by conventional methods. The method disclosed herein provides an effective and economical process for removing boron along with other impurities from silicon.

Use of zirconium is also effective in removing other impurities like iron and aluminum. Iron and aluminum migrate toward the slag and react with zirconium forming iron zirconate and aluminum zirconate, respectively.

The coarse particles in the pellet and coarse particle mixture have no added zirconium like the pellets. However, it has been found that because of the close proximity of the pellets and coarse particles, zirconium present in the slag material of pellets attracts and adsorbs boron and other impurities from adjacent coarse particles.

As previously mentioned, all of the silicon starting material 100 could have been micronized and mixed with a gettering agent like zirconia and pelletized. However, by mixing only a portion of the starting material 100 with a gettering agent as shown in FIG. 1, an economical, yet effective method of purification is provided.

By the present method, a substantial quantity of impurities can be removed from the molten silicon and adsorbed into the slag. After the heating and oxidizing process 114, the pellets and coarse particles are allowed to cool in a cooling process 116, causing solidification and hardening of the now purified molten silicon.

The next two steps involve separating the purified and solidified silicon from the slag outer layer. A grinding process 116 is first performed to physically remove large portions of the slag. Removing slag by grinding is relatively easy as the solid purified silicon is generally harder than the outer slag layer. Grinding can be accomplished by a number of well-known grinding or abrading methods or apparatuses.

After the grinding process 116, remaining slag is removed by an etching process 120. Etching can be performed using a number of commonly used etching solutions like sodium hydroxide.

After the etching process 120, the resulting purified silicon particles are cleaned and dried in a cleaning process 124 to remove any remaining slag or residue from the etching process 120. The cleaning process 122 produces generally purified silicon particles.

Next, the purified silicon particles are subjected to a quality assurance check at 124. If the silicon fails to meet the required level of solar grade purity, it is rejected and returned to the mixing process 112, where the rejected silicon is mixed with pellets and coarse particles, which are subsequently subjected to the heating and oxidation process 114.

If the purified silicon passes the quality assurance check 124, it can then be used as material for solar cells. To make solar cells, the purified silicon is subjected to a series of well-known processes (not shown). These processes can include applying a crystal puller to form single crystal silicon, wafering, forming a p-n junction and adding electrical contacts.

It should be noted that the method described herein is not limited for use in converting metallurgical grade silicon into solar grade silicon; the method can be used for removing impurities from various grades of silicon.

A technical advantage of the present invention is that it allows low grade silicon to be effectively and economically purified and made into a high grade silicon. The high grade silicon can be used to produce efficient solar cells.

Although the present invention has been described with respect to a specific, preferred embodiment, various changes may be suggested to one skilled in the art, and it is intended that the present invention encompasses such changes and modifications as fall within the scope of the appended claims.

What is claimed is:

1. A method for removing impurities from low grade silicon, comprising the steps of:
   mixing a solid-phase particulate zirconium compound with the solid-phase particulate low grade silicon; and
   forming a solid phase slag from oxygen and one portion of the low grade silicon for adsorbing impurities in the remaining portion of the low grade silicon and thereby forming purified silicon from the remaining portion of the low grade silicon.

2. The method of claim 1, further including the step of reacting the slag with the zirconium compound.

3. The method of claim 1, further comprising the step of melting the remaining portion of low grade silicon to allow migration of impurities in the remaining portion of the low grade silicon to the slag.

4. The method of claim 1, wherein said step of mixing a zirconium compound with the low grade silicon comprises mixing zirconia with the low grade silicon.

5. The method of claim 1, further comprising the step of separating the slag from the purified silicon.

6. The method of claim 5, wherein said step of separating the slag comprises grinding the slag.

7. The method of claim 5, wherein said step of separating the slag comprises etching the slag.

8. A method of removing impurities from low grade silicon, comprising:
   mixing a solid-phase particulate zirconium compound with the solid-phase particulate low grade silicon to make a zirconium compound and silicon mixture;

oxidizing one portion of the silicon in said mixture to form solid slag for adsorbing the impurities in a remaining generally unoxidized portion of the silicon; and melting the generally unoxidized portion of the silicon to allow zirconium and impurities in the generally unoxidized portion to migrate toward and become adsorbed by the slag.

9. The method of claim 8, wherein said step of mixing a zirconium compound with the low grade silicon comprises mixing zirconia with the low grade silicon.

10. The method of claim 8, further comprising the step of forming at least one pellet from the zirconium and silicon mixture prior to said step of oxidizing one portion of the silicon.

11. The method of claim 10, wherein said step of forming at least one pellet comprises forming a pellet having a diameter of approximately 0.040 inches.

12. The method of claim 8, wherein said step of melting the unoxidized portion comprises heating the unoxidized portion to a temperature of approximately 1420° C.

13. The method of claim 8, further comprising the step of removing the slag from the generally unoxidized portion.

14. The method of claim 13, wherein said step of removing the slag comprises grinding the slag.

15. The method of claim 13, wherein said step of removing the slag comprises etching the slag.

16. The method of claim 8, wherein said step of oxidizing one portion of the silicon in said mixture comprises heating the mixture in an air atmosphere.

17. A method of purifying low grade silicon having impurities, comprising the steps of:

mixing the low grade silicon with zirconia to form a low grade silicon and zirconia mixture;

forming pellets from the low grade silicon and zirconia mixture;

oxidizing the outer surface of the pellets to form slag for adsorbing zirconia and the impurities from the remaining generally unoxidized low grade silicon and zirconia mixture;

melting the remaining generally unoxidized low grade silicon and zirconia mixture to allow zirconia and the impurities to migrate to the slag, thereby forming purified silicon;

solidifying the purified silicon; and separating the slag from the purified silicon.

18. The method of claim 17, wherein said step of mixing the low grade silicon with zirconia comprises first micronizing the low grade silicon and the zirconia and then intimately mixing the low grade silicon with the zirconia.

19. The method of claim 17, wherein said step of forming pellets comprises forming pellets having a diameter of approximately 0.060 inches.

20. The method of claim 17, wherein said step of melting comprises heating the remaining generally unoxidized low grade silicon and zirconia mixture to a temperature of approximately 1420° C.

21. The method of claim 17, wherein said step of separating the slag comprises grinding the slag.

22. The method of claim 17, wherein said step of separating the slag comprises etching the slag.

* * * * *